United States Patent
Payton (10) Patent No.: US 10,922,139 B2
(45) Date of Patent: Feb. 16, 2021

(54) SYSTEM, METHOD, AND COMPUTER PROGRAM PRODUCT FOR PROCESSING LARGE DATA SETS BY BALANCING ENTROPY BETWEEN DISTRIBUTED DATA SEGMENTS

(71) Applicant: Visa International Service Association, San Francisco, CA (US)

(72) Inventor: Paul Max Payton, San Carlos, CA (US)

(73) Assignee: Visa International Service Association, San Francisco, CA (US)

( * ) Notice: Subject to any disclaimer, the term of this patent is extended or adjusted under 35 U.S.C. 154(b) by 123 days.

(21) Appl. No.: 16/157,543

(22) Filed: Oct. 11, 2018

(65) Prior Publication Data

US 2020/0117507 A1    Apr. 16, 2020

(51) Int. Cl.
  *G06F 9/50* (2006.01)
  *G06F 9/46* (2006.01)
  *G06F 16/27* (2019.01)

(52) U.S. Cl.
  CPC ........... *G06F 9/505* (2013.01); *G06F 9/466* (2013.01); *G06F 9/5072* (2013.01); *G06F 16/278* (2019.01)

(58) Field of Classification Search
  CPC ........ G06F 9/505; G06F 9/466; G06F 9/5072; G06F 16/278
  See application file for complete search history.

(56) References Cited

U.S. PATENT DOCUMENTS 6,278,989 B1    8/2001  Chaudhuri et al.
6,661,839 B1 *  12/2003 Ishida ............... G01R 31/31921
                                              341/51

(Continued)

FOREIGN PATENT DOCUMENTS

WO    2008019222 A1    2/2008

OTHER PUBLICATIONS

Kontkanen et al., "MDL Histogram Density Estimation", Proceedings of Machine Learning Research, 2007, vol. 2, pp. 219-226.

(Continued)

*Primary Examiner* — Meng Ai T An
*Assistant Examiner* — Michael W Ayers
(74) *Attorney, Agent, or Firm* — The Webb Law Firm (57) ABSTRACT

Systems, methods, and computer program products are provided for load balancing for processing large data sets. The method includes identifying a number of segments and a transaction data set comprising transaction data for a plurality of transactions, the transaction data for each transaction of the plurality of transactions comprising a transaction value, determining an entropy of the transaction data set based on the transaction value of each transaction of the plurality of transactions, segmenting the transaction data set into the number of segments based on the entropy of the transaction data set and balancing respective entropies of each segment of the number of segments, and distributing processing tasks associated with each segment of the number of segments to at least one processor of a plurality of processors to process each transaction in each respective segment.

20 Claims, 4 Drawing Sheets

(56) References Cited

U.S. PATENT DOCUMENTS

| | | | |
|---|---|---|---|
| 6,799,164 B1* | 9/2004 | Araki | G10L 19/0208 |
| | | | 704/200.1 |
| 7,756,900 B2 | 7/2010 | Burgess et al. | |
| 8,413,160 B2 | 4/2013 | Armes et al. | |
| 8,677,105 B2 | 3/2014 | Abdallah | |
| 9,741,337 B1 | 8/2017 | Shastry et al. | |
| 2006/0149671 A1 | 7/2006 | Nix et al. | |
| 2010/0115097 A1* | 5/2010 | Gnanasambandam | |
| | | | G06F 9/5027 |
| | | | 709/226 |
| 2010/0269174 A1 | 10/2010 | Shelest | |
| 2011/0099635 A1* | 4/2011 | Silberman | G06F 21/562 |
| | | | 726/24 |
| 2013/0024868 A1* | 1/2013 | Jeong | G06F 9/505 |
| | | | 718/104 |
| 2017/0004306 A1* | 1/2017 | Zhang | G06F 21/56 |
| 2017/0223097 A1* | 8/2017 | Zhang | H04L 67/1008 |

OTHER PUBLICATIONS

To et al., "Entropy-based Histograms for Selectivity Estimation", CIKM '13, 2013, 10 pages.

* cited by examiner

SYSTEM, METHOD, AND COMPUTER PROGRAM PRODUCT FOR PROCESSING LARGE DATA SETS BY BALANCING ENTROPY BETWEEN DISTRIBUTED DATA SEGMENTS

BACKGROUND

Field

The present invention relates to load balancing processing tasks and, in non-limiting embodiments or aspects, a system, method, and computer program product for load balancing to process large data sets.

Description of Related Art

Large data sets, including transaction data sets, are often skewed such that the data is not evenly distributed. For example, with transaction data for a plurality of transactions, there are often a large number of account identifiers, such as personal account numbers (PANs), associated with a small portion of transactions and a small number of account identifiers associated with a large portion of transactions. Likewise, for transaction values for each transaction, there are often a large number of account identifiers associated with transaction values that are relatively lower than transaction values associated with a smaller number of account identifiers.

To process large transaction data sets, transactions may be grouped by PAN or by total spend per PAN. This results in uneven processing times for each set of data because, as an example, the processing units that are assigned processing tasks for transaction data for PANs associated with numerous transactions will take longer to process their respective tasks than processing units that are allocated transaction data for PANs with relatively fewer transactions. As an example, transaction records for PANs with few relative transactions could take seconds or minutes to process, whereas transaction records for PANs with more relative transactions at the other end of the spectrum could take an hour or longer to process. This results in an inefficient use of computing resources, such as memory and processing units.

SUMMARY

According to a non-limiting embodiment or aspect, provided is a computer-implemented method for load balancing for processing large data sets, including: identifying, with at least one processor, a number of segments and a transaction data set comprising transaction data for a plurality of transactions, the transaction data for each transaction of the plurality of transactions comprising a transaction value; determining, with at least one processor, an entropy of the transaction data set based on the transaction value of each transaction of the plurality of transactions; segmenting, with at least one processor, the transaction data set into the number of segments based on the entropy of the transaction data set and balancing respective entropies of each segment of the number of segments; and distributing, with at least one processor, processing tasks associated with each segment of the number of segments to at least one processor of a plurality of processors to process each transaction in each respective segment.

In non-limiting embodiments, the transaction data set comprises a plurality of transaction values sorted in a data structure stored in memory of a computer system. In non-limiting embodiments, the data structure comprises an array, and the plurality of transaction values are stored in the array as floating point values. In non-limiting embodiments, the plurality of processors comprises a plurality of cores of at least one processor, and each segment is assigned to a core of the at least one processor. In non-limiting embodiments, balancing respective entropies of each segment of the number of segments comprises adjusting a scope of each segment based on a comparison to at least one entropy of at least one adjacent segment such that the respective entropies of each segment are within a predefined tolerance of the at least one entropy of the at least one adjacent segment.

According to another non-limiting embodiment, provided is a computer-implemented method for load balancing for processing large data sets based on entropy, including: (a) identifying, with at least one processor, a number of segments and a transaction data set for a plurality of transactions to be processed, the transaction data set comprising data distributed over a transaction value of each transaction and at least one other parameter; (b) determining, with at least one processor, an entropy of the transaction data set; (c) segmenting, with at least one processor, the transaction data set into respective pairs of transaction data sets based on the entropy of the transaction data set and a closest match between respective entropies of each individual transaction data set in the pair of transaction data sets; (d) repeating step (c) for each transaction data set formed by segmentation until a total number of transaction data sets reaches the number of segments; and (e) distributing, with at least one processor, processing tasks associated with each segment of the number of segments to at least one processor of a plurality of processors to process each transaction in each respective segment.

In non-limiting embodiments, the transaction data set comprises a plurality of transaction values sorted in a data structure stored in memory of a computer system. In non-limiting embodiments, the data structure comprises an array, and the plurality of transaction values are stored in the array as floating point values. In non-limiting embodiments, the plurality of processors comprises a plurality of cores of at least one processor, and each segment is assigned to a core of the at least one processor. In non-limiting embodiments, balancing respective entropies of each segment of the number of segments comprises adjusting a scope of each segment based on a comparison to at least one entropy of at least one adjacent segment such that the respective entropies of each segment are within a predefined tolerance of the at least one entropy of the at least one adjacent segment.

According to another non-limiting embodiment, provided is a computer program product for load balancing for processing large data sets, including at least one non-transitory computer-readable medium including program instructions that, when executed by at least one processor, cause the at least one processor to: identify a number of segments and a transaction data set comprising transaction data for a plurality of transactions, the transaction data for each transaction of the plurality of transactions comprising a transaction value; determine an entropy of the transaction data set based on the transaction value of each transaction of the plurality of transactions; segment the transaction data set into the number of segments based on the entropy of the transaction data set and balancing respective entropies of each segment of the number of segments; and distribute processing tasks associated with each segment of the number of segments to at least one processor of a plurality of processors to process each transaction in each respective segment.

In non-limiting embodiments, the transaction data set comprises a plurality of transaction values sorted in a data structure stored in memory of a computer system. In non-limiting embodiments, the data structure includes an array, and the plurality of transaction values are stored in the array as floating point values. In non-limiting embodiments, the plurality of processors comprises a plurality of cores of at least one processor, and each segment is assigned to a core of the at least one processor. In non-limiting embodiments, balancing respective entropies of each segment of the number of segments comprises adjusting a scope of each segment based on a comparison to at least one entropy of at least one adjacent segment such that the respective entropies of each segment are within a predefined tolerance of the at least one entropy of the at least one adjacent segment.

According to another non-limiting embodiment, provided is a computer program product for load balancing for processing large data sets based on entropy, including at least one non-transitory computer-readable medium including program instructions that, when executed by at least one processor, cause the at least one processor to: (a) identify a number of segments and a transaction data set for a plurality of transactions to be processed, the transaction data set comprising data distributed over a transaction value of each transaction and at least one other parameter; (b) determine an entropy of the transaction data set; (c) segment the transaction data set into respective pairs of transaction data sets based on the entropy of the transaction data set and a closest match between respective entropies of each individual transaction data set in the pair of transaction data sets; (d) repeat step (c) for each transaction data set formed by segmentation until a total number of transaction data sets reaches the number of segments; and (e) distribute processing tasks associated with each segment of the number of segments to at least one processor of a plurality of processors to process each transaction in each respective segment.

In non-limiting embodiments, the transaction data set comprises a plurality of transaction values sorted in a data structure stored in memory of a computer system. In non-limiting embodiments, the data structure includes an array, and the plurality of transaction values are stored in the array as floating point values. In non-limiting embodiments, the plurality of processors comprises a plurality of cores of at least one processor, and each segment is assigned to a core of the at least one processor. In non-limiting embodiments, balancing respective entropies of each segment of the number of segments comprises adjusting a scope of each segment based on a comparison to at least one entropy of at least one adjacent segment such that the respective entropies of each segment are within a predefined tolerance of the at least one entropy of the at least one adjacent segment.

According to another non-limiting embodiment, provided is a system for load balancing for processing large data sets, including: a plurality of data storage arrays comprising transaction data; and at least one processor in communication with the plurality of data storage arrays, the at least one processor programmed or configured to: identify a number of segments and a transaction data set for a plurality of transactions from the transaction data, the transaction data for each transaction of the plurality of transactions comprising a transaction value; determine an entropy of the transaction data set based on the transaction value of each transaction of the plurality of transactions; segment the transaction data set into the number of segments based on the entropy of the transaction data set and balancing respective entropies of each segment of the number of segments; and distribute processing tasks associated with each segment of the number of segments to at least one processor of a plurality of processors to process each transaction in each respective segment.

In non-limiting embodiments of the system, the transaction data set comprises a plurality of transaction values sorted in a data structure stored in memory of a computer system. In non-limiting embodiments, the data structure includes an array, and the plurality of transaction values are stored in the array as floating point values. In non-limiting embodiments, the plurality of processors comprises a plurality of cores of at least one processor, and each segment is assigned to a core of the at least one processor. In non-limiting embodiments, balancing respective entropies of each segment of the number of segments comprises adjusting a scope of each segment based on a comparison to at least one entropy of at least one adjacent segment such that the respective entropies of each segment are within a predefined tolerance of the at least one entropy of the at least one adjacent segment.

According to another non-limiting embodiment, provided is a system for load balancing for processing large data sets, including: a plurality of data storage arrays comprising transaction data; and at least one processor in communication with the plurality of data storage arrays, the at least one processor programmed or configured to: (a) identify a number of segments and a transaction data set for a plurality of transactions from the transaction data, the transaction data set comprising data distributed over a transaction value of each transaction and at least one other parameter; (b) determine an entropy of the transaction data set; (c) segment the transaction data set into respective pairs of transaction data sets based on the entropy of the transaction data set and a closest match between respective entropies of each individual transaction data set in the pair of transaction data sets; (d) repeat step (c) for each transaction data set formed by segmentation until a total number of transaction data sets reaches the number of segments; and (e) distribute processing tasks associated with each segment of the number of segments to at least one processor of a plurality of processors to process each transaction in each respective segment.

Further embodiments or aspects are set forth in the following numbered clauses:

Clause 1: A computer-implemented method for load balancing for processing large data sets, comprising: identifying, with at least one processor, a number of segments and a transaction data set comprising transaction data for a plurality of transactions, the transaction data for each transaction of the plurality of transactions comprising a transaction value; determining, with at least one processor, an entropy of the transaction data set based on the transaction value of each transaction of the plurality of transactions; segmenting, with at least one processor, the transaction data set into the number of segments based on the entropy of the transaction data set and balancing respective entropies of each segment of the number of segments; and distributing, with at least one processor, processing tasks associated with each segment of the number of segments to at least one processor of a plurality of processors to process each transaction in each respective segment.

Clause 2: The method of clause 1, wherein the transaction data set comprises a plurality of transaction values sorted in a data structure stored in memory of a computer system.

Clause 3: The method of clause 1 or 2, wherein the data structure comprises an array, and wherein the plurality of transaction values are stored in the array as floating point values.

Clause 4: The method of any of clauses 1-3, wherein the plurality of processors comprises a plurality of cores of at least one processor, and wherein each segment is assigned to a core of the at least one processor.

Clause 5: The method of any of clauses 1-4, wherein balancing respective entropies of each segment of the number of segments comprises adjusting a scope of each segment based on a comparison to at least one entropy of at least one adjacent segment such that the respective entropies of each segment are within a predefined tolerance of the at least one entropy of the at least one adjacent segment.

Clause 6: A computer-implemented method for load balancing for processing large data sets based on entropy, comprising: (a) identifying, with at least one processor, a number of segments and a transaction data set for a plurality of transactions to be processed, the transaction data set comprising data distributed over a transaction value of each transaction and at least one other parameter; (b) determining, with at least one processor, an entropy of the transaction data set; (c) segmenting, with at least one processor, the transaction data set into respective pairs of transaction data sets based on the entropy of the transaction data set and a closest match between respective entropies of each individual transaction data set in the pair of transaction data sets; (d) repeating step (c) for each transaction data set formed by segmentation until a total number of transaction data sets reaches the number of segments; and (e) distributing, with at least one processor, processing tasks associated with each segment of the number of segments to at least one processor of a plurality of processors to process each transaction in each respective segment.

Clause 7: The method of clause 6, wherein the transaction data set comprises a plurality of transaction values sorted in a data structure stored in memory of a computer system.

Clause 8: The method of clause 6 or 7, wherein the data structure comprises an array, and wherein the plurality of transaction values are stored in the array as floating point values.

Clause 9: The method of any of clauses 6-8, wherein the plurality of processors comprises a plurality of cores of at least one processor, and wherein each segment is assigned to a core of the at least one processor.

Clause 10: The method of any of clauses 6-9, wherein balancing respective entropies of each segment of the number of segments comprises adjusting a scope of each segment based on a comparison to at least one entropy of at least one adjacent segment such that the respective entropies of each segment are within a predefined tolerance of the at least one entropy of the at least one adjacent segment.

Clause 11: A computer program product for load balancing for processing large data sets, comprising at least one non-transitory computer-readable medium including program instructions that, when executed by at least one processor, cause the at least one processor to: identify a number of segments and a transaction data set comprising transaction data for a plurality of transactions, the transaction data for each transaction of the plurality of transactions comprising a transaction value; determine an entropy of the transaction data set based on the transaction value of each transaction of the plurality of transactions; segment the transaction data set into the number of segments based on the entropy of the transaction data set and balancing respective entropies of each segment of the number of segments; and distribute processing tasks associated with each segment of the number of segments to at least one processor of a plurality of processors to process each transaction in each respective segment.

Clause 12: The computer program product of clause 11, wherein the transaction data set comprises a plurality of transaction values sorted in a data structure stored in memory of a computer system.

Clause 13: The computer program product of clause 11 or 12, wherein the data structure comprises an array, and wherein the plurality of transaction values are stored in the array as floating point values.

Clause 14: The computer program product of any of clauses 11-13, wherein the plurality of processors comprises a plurality of cores of at least one processor, and wherein each segment is assigned to a core of the at least one processor.

Clause 15: The computer program product of any of clauses 11-14, wherein balancing respective entropies of each segment of the number of segments comprises adjusting a scope of each segment based on a comparison to at least one entropy of at least one adjacent segment such that the respective entropies of each segment are within a predefined tolerance of the at least one entropy of the at least one adjacent segment.

Clause 16: A computer program product for load balancing for processing large data sets based on entropy, comprising at least one non-transitory computer-readable medium including program instructions that, when executed by at least one processor, cause the at least one processor to: (a) identify a number of segments and a transaction data set for a plurality of transactions to be processed, the transaction data set comprising data distributed over a transaction value of each transaction and at least one other parameter; (b) determine an entropy of the transaction data set; (c) segment the transaction data set into respective pairs of transaction data sets based on the entropy of the transaction data set and a closest match between respective entropies of each individual transaction data set in the pair of transaction data sets; (d) repeat step (c) for each transaction data set formed by segmentation until a total number of transaction data sets reaches the number of segments; and (e) distribute processing tasks associated with each segment of the number of segments to at least one processor of a plurality of processors to process each transaction in each respective segment.

Clause 17: The computer program product of clause 16, wherein the transaction data set comprises a plurality of transaction values sorted in a data structure stored in memory of a computer system.

Clause 18: The computer program product of clause 16 or 17, wherein the data structure comprises an array, and wherein the plurality of transaction values are stored in the array as floating point values.

Clause 19: The computer program product of any of clauses 16-18, wherein the plurality of processors comprises a plurality of cores of at least one processor, and wherein each segment is assigned to a core of the at least one processor.

Clause 20: The computer program product of any of clauses 16-19, wherein balancing respective entropies of each segment of the number of segments comprises adjusting a scope of each segment based on a comparison to at least one entropy of at least one adjacent segment such that the respective entropies of each segment are within a predefined tolerance of the at least one entropy of the at least one adjacent segment.

Clause 21: A system for load balancing for processing large data sets, comprising: a plurality of data storage arrays comprising transaction data; and at least one processor in communication with the plurality of data storage arrays, the at least one processor programmed or configured to: identify a number of segments and a transaction data set for a plurality of transactions from the transaction data, the transaction data for each transaction of the plurality of transactions comprising a transaction value; determine an entropy of the transaction data set based on the transaction value of each transaction of the plurality of transactions; segment the transaction data set into the number of segments based on the entropy of the transaction data set and balancing respective entropies of each segment of the number of segments; and distribute processing tasks associated with each segment of the number of segments to at least one processor of a plurality of processors to process each transaction in each respective segment.

Clause 22: The system of clause 21, wherein the transaction data set comprises a plurality of transaction values sorted in a data structure stored in memory of a computer system.

Clause 23: The system of clause 21 or 22, wherein the data structure comprises an array, and wherein the plurality of transaction values are stored in the array as floating point values.

Clause 24: The system of any of clauses 21-23, wherein the plurality of processors comprises a plurality of cores of at least one processor, and wherein each segment is assigned to a core of the at least one processor.

Clause 25: The system of any of clauses 21-24, wherein balancing respective entropies of each segment of the number of segments comprises adjusting a scope of each segment based on a comparison to at least one entropy of at least one adjacent segment such that the respective entropies of each segment are within a predefined tolerance of the at least one entropy of the at least one adjacent segment.

Clause 26: A system for load balancing for processing large data sets, comprising: a plurality of data storage arrays comprising transaction data; and at least one processor in communication with the plurality of data storage arrays, the at least one processor programmed or configured to: (a) identify a number of segments and a transaction data set for a plurality of transactions from the transaction data, the transaction data set comprising data distributed over a transaction value of each transaction and at least one other parameter; (b) determine an entropy of the transaction data set; (c) segment the transaction data set into respective pairs of transaction data sets based on the entropy of the transaction data set and a closest match between respective entropies of each individual transaction data set in the pair of transaction data sets; (d) repeat step (c) for each transaction data set formed by segmentation until a total number of transaction data sets reaches the number of segments; and (e) distribute processing tasks associated with each segment of the number of segments to at least one processor of a plurality of processors to process each transaction in each respective segment.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figure and appendices, in which.

DESCRIPTION

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction processing system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number or other unique identifier that uniquely identifies it among other issuer institutions.

As used herein, the term "issuer institution" may refer to one or more entities, such as a bank, that provide accounts to customers for conducting payment transactions, such as initiating credit and/or debit payments. For example, an issuer institution may provide an account identifier, such as a PAN, to a customer that uniquely identifies one or more accounts associated with that customer. The account identifier may be embodied on a physical financial instrument, such as a payment card, and/or may be electronic and used for electronic payments. The terms "issuer institution," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "computing device" may refer to one or more electronic devices that are configured to directly or indirectly communicate with or over one or more networks. A computing device may be a mobile device, a desktop computer, and/or any other like device. Furthermore, the term "computer" may refer to any computing device that includes the necessary components to receive, process, and output data, and normally includes a display, a processor, a memory, an input device, and a network interface. As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

The term "processor," as used herein, may represent any type of processing unit, such as a single processor having one or more cores, one or more cores of one or more processors, multiple processors each having one or more cores, and/or other arrangements and combinations of processing units.

The term "account data," as used herein, refers to any data concerning one or more accounts for one or more users. Account data may include, for example, one or more account identifiers, user identifiers, transaction histories, balances, credit limits, issuer institution identifiers, and/or the like.

Non-limiting embodiments described herein are directed to a system, method, and computer program product for load balancing to process large data sets with multiple processing units. Processing large data sets, such as transaction data processed by a transaction processing system for multiple issuers, merchants, and consumers, utilizes a vast amount of computing resources, such as processing cycles and memory. Non-limiting embodiments described herein utilize an allocation processor configured with an allocation algorithm to segment (e.g., bin) large data sets in order to load balance the associated processing tasks across multiple transaction processors (e.g., one or more processors and/or cores) to increase the speed of the computing system and to optimize the use of computing resources. By utilizing an allocation processor configured with an allocation algorithm to segment transaction data based on the distribution entropy of a data set and the individual segments, an efficient use of computing resources is obtained that allows for transactions to be processed evenly (e.g., such that the processors complete their respective tasks at the same time or in temporal proximity) and more efficiently (e.g., such that more transactions can be processed in a shorter period of time). Moreover, in non-limiting embodiments, transaction data sets are sorted based on a floating point value, such as a transaction value, rather than a PAN or other discrete-valued parameter. By sorting and segmenting based on a floating point value, rather than a discrete value, the data set can be segmented in an even manner that allows for consistent and efficient parallel processing.

Figure 1A:
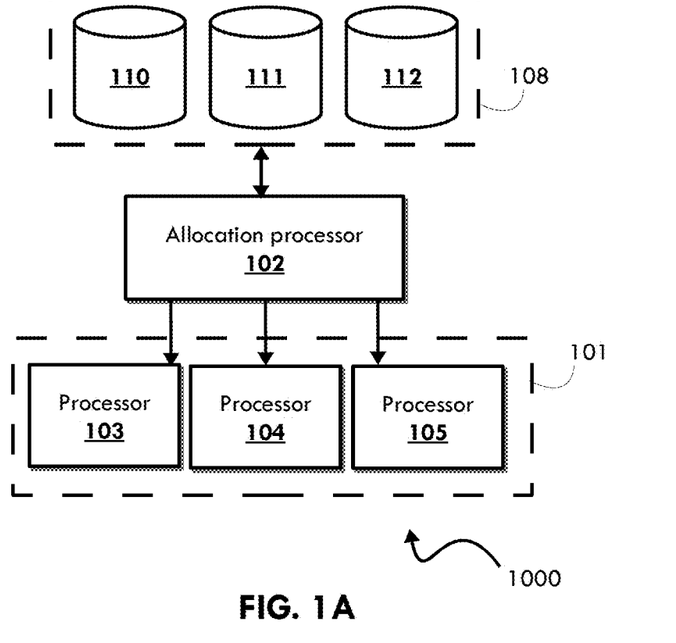
FIG. 1A is a schematic diagram of a system for load balancing to process large data sets according to a non-limiting embodiment.

Referring now to FIG. 1A, shown is a system 1000 for load balancing to process large data sets according to a non-limiting embodiment. The system 1000 includes an allocation processor 102, a storage array 108 including one or more data storage devices 110, 111, 112, and a processing stack 101 including one or more transaction processors 103, 104, 105. The allocation processor 102 and transaction processors 103, 104, 105 may be one or more processors, such as a processor where transaction processors 103, 104, 105 represent cores of the processor. In other non-limiting embodiments, allocation processor 102 and transaction processors 103, 104, 105 may represent physically separate processors. It will be appreciated that various arrangements are possible, and that references to a "processor" herein may represent any type of processing unit, such as a single processor having one or more cores, one or more cores of one or more processors, multiple processors each having one or more cores, and/or other arrangements and combinations of processing units. In non-limiting embodiments, for example, each segment of data is assigned to one or more specified cores 103, 104, 105 of a plurality of processors to complete the associated processing tasks.

With continued reference to FIG. 1A, the allocation processor 102 may be in communication with the storage array 108 through a parallel data processing system such as, but not limited to, implementations of the Hadoop framework. It will be appreciated that various data processing systems may be used. In some non-limiting embodiments, a separate processor may be arranged between the allocation processor 102 and the storage array 108 to retrieve transaction data stored in the storage array 108. A transaction processing system (not shown in FIG. 1A) may be in communication with the storage array 108 such that transaction data communicated to the transaction processing system is stored in the storage array 108. In some non-limiting examples, the transaction processing system may include allocation processor 102 and transaction processors 103, 104, 105, although it will be appreciated that one or more of allocation processor 102 and transaction processors 103, 104, 105 may be operated external to a transaction processing system.

With continued reference to FIG. 1A, the allocation processor 102 identifies a transaction data set to be processed from the storage array 108. The transaction data set may comprise a plurality of transaction records, where each transaction record includes transaction data parameters such as, but not limited to, an account identifier (e.g., a PAN or a token), a merchant identifier, a transaction value, a transaction identifier, a transaction time, loyalty data, and/or other parameters relevant to a transaction. The allocation processor 102 may also identify a number of segments (e.g., bins) to segment the transaction data set into. The number of segments may be predetermined or, in other examples, may be determined based on the size of the transaction data set, a number of available processors 103, 104, 105, a number of processors assigned to a particular stack (e.g., a Hadoop stack), a total number of processors in a given system, or in any other manner.

Still referring to FIG. 1A, the allocation processor 102 sorts the transaction records in the transaction data set according to one or more algorithms and based on one or more key fields of the transaction data. For example, the allocation processor 102 may sort the transaction records based on the transaction value of each transaction record such that the key field is the transaction value associated with each transaction. The transaction records may be reduced transaction records for purposes of sorting, such as data structures including a transaction identifier and a transaction value. The sorted values may be stored in memory as floating point values in an array. It will be appreciated that various parameters may be used as the key field and that various data structures and sorting algorithms may be utilized.

With continued reference to FIG. 1A, the allocation processor 102 allocates each segment to a transaction processor 103, 104, 105 for processing. In some examples, the allocation processor 102 may distribute the segments among the transaction processors 103, 104, 105 such that the processing of each segment is finished at or near the same time. As an example, the allocation of segments may be performed with or in conjunction with a parallel data processing system, such as Hadoop. In non-limiting examples utilizing Hadoop, the platform's Map/Reduce framework may be used. The "Map" framework may be used to segment (e.g., bin or partition) the data set into segments using a first key field (e.g., such as a transaction value) for processing, resulting in a data output. The "Reduce" framework may be used to collect the data output based on a second key field, which may be the same or different from the first key field, process the output with the second key field, and generate a final output. In some examples, two processors (e.g., two cores) may be assigned to a segment such that one processor is used for the "Map" framework and another for the "Reduce" framework. It will be appreciated that various other arrangements are possible with different data processing systems and frameworks.

In non-limiting embodiments, the number of segments may be determined based on a number of available processors. For example, a Hadoop environment has a fixed number of processors (e.g., individual processors or cores of processors). The number of segments may be the fixed number of processors or a multiple of the fixed number of processors. In an example implementation in which 400 processors are available (e.g., 400 cores of a plurality of processors), it may be desirable to have 200 segments such that 200 processors are assigned as mappers (e.g., to process the "Map" aspects of the framework mentioned above) and 200 processors assigned as reducers (e.g., to process the "Reduce" aspects of the framework mentioned above) in order to complete all processes in a single cycle. In the example implementation in which 400 processors are available, it may be desirable to have 1000 segments such that each processor runs through five cycles of data. It will appreciated that various other arrangements are possible.

Figure 1B:
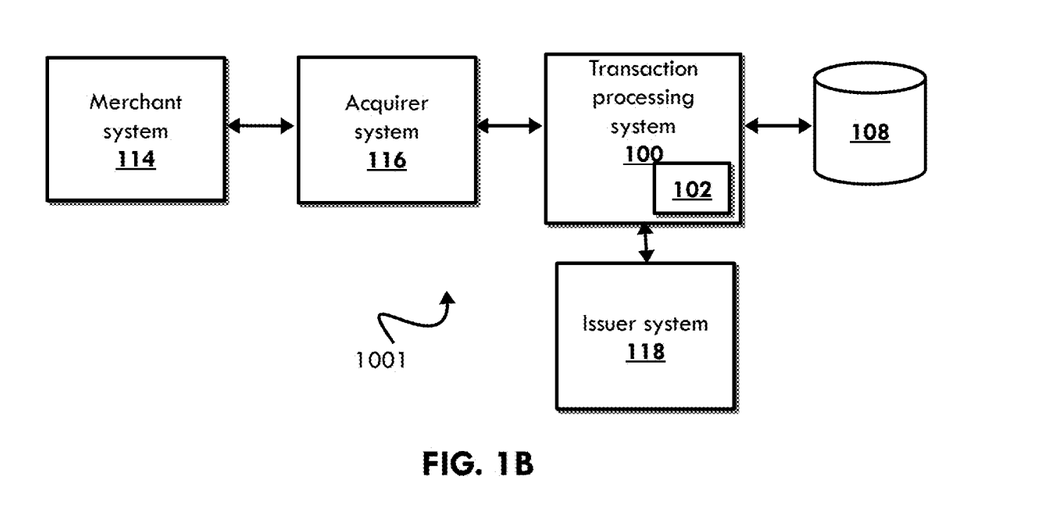
FIG. 1B is a schematic diagram of a system for load balancing to process large data sets according to a non-limiting embodiment.

Referring now to FIG. 1B, shown is a system 1001 for load balancing to process large data sets according to a non-limiting embodiment. In this example, the allocation processor 102 is part of a transaction processing system 100. The transaction processing system 100 is in communication with a merchant system 114 through an acquirer system 116 or payment gateway. The transaction processing system 100 is also in communication with one or more issuer systems 118. In this manner, the transaction processing system collects transaction data, such as transaction data from transaction requests, authorization requests, authorization responses, and/or other like packets or messages communicated within the system 1001. The transaction data may be stored in a storage array 108 by the transaction processing system 100. In this manner, and as described with respect to the system 1000 shown in FIG. 1A, the allocation processor 102 may access the transaction data in the storage array 108, segment the transaction data, and assign a transaction processor to each segment.

In non-limiting embodiments, each transaction record may be updated or modified to include a segment number (e.g., a bin number) as a parameter. This process may be performed periodically to update each record with the segment number that the record is assigned to. An output of this process results in a list of segments, where each segment is associated with a segment number, a lower limit on transaction value, and an upper limit on transaction value. The list of segments may be stored in any type of data structure such as, but not limited to, a table, array, and/or the like. Once the list of segments is identified, the full transaction data set may be processed according to the segmentation. For example, the list of segments may be used as a look-up table for each transaction record to determine which segment (and which processor) each transaction is allocated to. In non-limiting embodiments, each segment is assigned to a core of a processor such that the transaction record can then be communicated to the corresponding processing unit.

Figure 3:
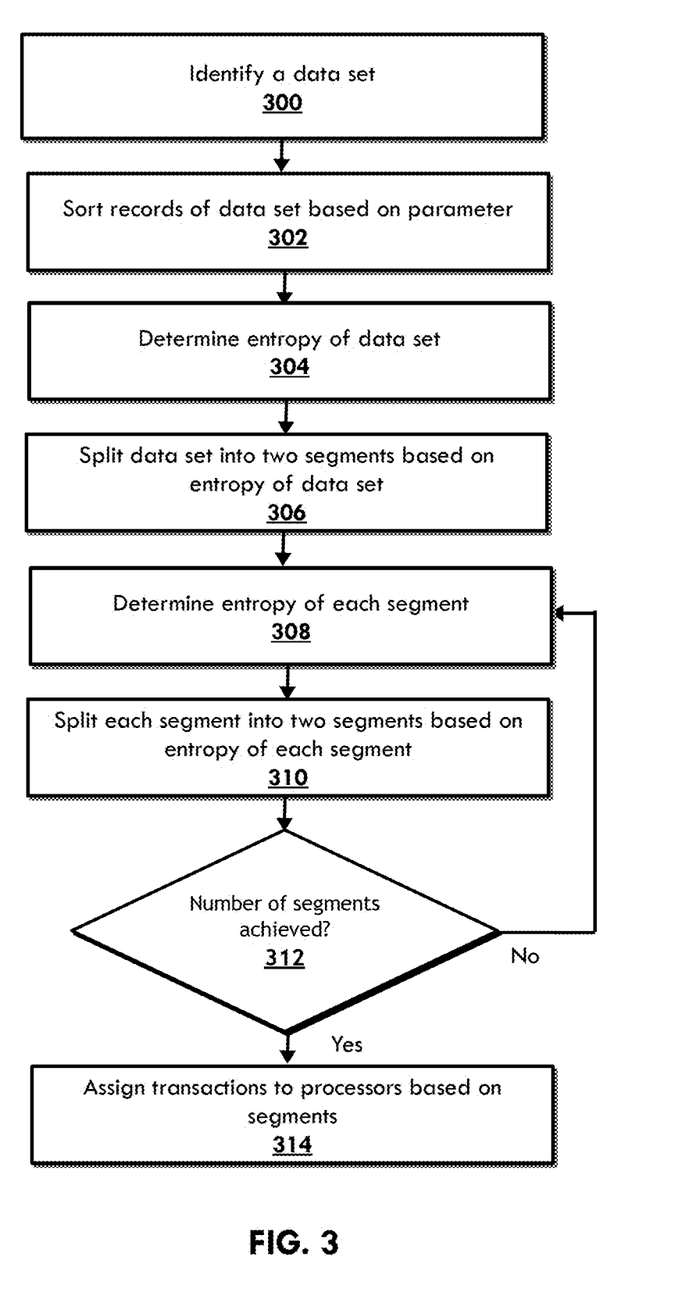
FIG. 3 is a flow diagram of a method for load balancing to process large data sets according to a non-limiting embodiment.

Referring now to FIG. 3, a method for load balancing to process a large data set is shown according to a non-limiting embodiment. The method shown in FIG. 3 includes an allocation algorithm for segmenting a data set into a plurality of segments for controlling distribution of processing tasks to a plurality of processors. At a first step 300, a data set is identified. The data set may be identified through user input, automatically based on the stored location of the data, automatically by searching for the data, and/or the like. It will be appreciated that a component of the system, such as an allocation processor, may identify a data set in any other manner. In some non-limiting examples, a data set may be a transaction data set for a time period that represents a plurality of transactions requested in that time period. In other non-limiting examples, a data set may be a transaction data set of a predetermined size such that each data set is processed in batches based on size. It will be appreciated that the data set may include any type of data and may be of any size.

With continued reference to FIG. 3, at step 302, the data set is sorted based on one or more parameters of the data set. For example, in non-limiting embodiments, the data set may include a plurality of records having one or more parameters, such as a record identifier parameter (e.g., transaction identifier). The data set may be stored in memory to be sorted. For example, in non-limiting embodiments, the data set may be stored in an array where one or more parameter values are stored as floating point values. Various other arrangements are possible. One or more sorting algorithms such as, but not limited to, a quick sort, a bubble sort, a merge sort, an insertion sort, and/or the like, may be used to sort the data set based on the value of one or more parameters. In non-limiting embodiments, the data set represents transaction data and each record includes at least a transaction identifier and a transaction value. The data set may be sorted based on the transaction value of each transaction.

At step 304 of the method shown in FIG. 3, an entropy of the data set is determined. In non-limiting embodiments, the entropy of a data set or segment is determined by the following equation:

$$H(X) = \Sigma_{i=1}^{n} P(x_i) I(x_i) = -\Sigma_{i=1}^{n} P(x_i) \log_b P(x_i)$$

In the above equation, b is the base of the logarithm used and common values for b may include two (2), Euler's number (e), and ten (10), each resulting in different units of entropy. For example, using base two (2), the units of entropy are bits, using base e, the units of entropy are nats/nits/nepits, and using base ten (10), the units of entropy are bans/hartleys/dits. It will be appreciated that various units and metrics of entropy may be used. Further, P in the above equation represents the probability that that a particular value or data set will appear in a particular segment.

At step 306 of the method shown in FIG. 3, the data set is divided into two segments based on the entropy of the data set. For example, the data set may be divided into two segments such that each segment has half of the entropy of the full data set. Each segment may therefore have equal or near-equal entropy values. It will be appreciated that the respective entropies may not be equal because the entropy of the data set being segmented may not be divisible by two.

Still referring to FIG. 3, at step 308 the entropy of each individual segment is determined. This value may have already been identified at step 306 and, in such examples, steps 306 and 308 may be a single step. In other examples, the entropy of each segment may be determined individually for each segment. At step 310, each segment is divided into two segments based on the entropy of the segment. Each segment may be a segment of the two segments that result from step 306, or a subsequent iteration of steps 308 through 312. For example, each segment may be split into two segments such that each segment of the two new segments has half of the entropy of the original segment. Each resulting segment may therefore have equal or near-equal entropy values.

At step 312, it is determined if a number of segments has been achieved. For example, a desired number of segments may be predetermined, input by a user, determined dynamically based on the data set, and/or the like. In other examples, the number of segments may be based on the initial size of the data set. Various other arrangements are possible. Until the number of segments is satisfied, the method may loop at step 312 by proceeding back to step 308. In this manner, some non-limiting embodiments operate recursively to continue segmenting the data set and each segment. Once the number of segments is satisfied at step 312, the method proceeds to step 314.

With continued reference to FIG. 3, at step 314, each transaction record is assigned to a processor of a plurality of processors (e.g., individual processors or cores of one or more processors). For example, each segment of the plurality of segments may be assigned to an available transaction processor of a plurality of available transaction processors. The available transaction processors may be, for example, determined from a total number of processors (e.g., individual processors or cores of processors), a predetermined number of processors, a number of available processors, currently-pending or queued processing jobs, and/or the like. As explained above, in non-limiting embodiments, the segments may be initially determined by first sorting transaction records by transaction values. Processors may be allocated to each segment in a static manner (e.g., a specific processor core assigned to a specific segment number) or in a dynamic manner (e.g., processors assigned to segment numbers based on then-current availability or other factors). Therefore, in some non-limiting examples, step 314 may include analyzing each individual transaction data record, determining which segment the data record should be assigned to, based on the transaction value of that record and the transaction value range of each segment, updating the data record to identify the segment number, and assigning the data record to the corresponding processor.

Although the method shown in FIG. 3 is illustrated as including a loop at steps 308 through 312 to recursively process and divide each segment until a number of segments is reached, it will be appreciated that an allocation algorithm may use also use one or more non-recursive methods for segmenting the data set into a number of segments. For example, after the transaction records are sorted at step 302 and the entropy of the data step determined at step 304, the allocation algorithm may determine to divide the data set into a number of segments based on determined ranges or values within the sorted range of transaction records. Division may be by powers of two (2), such as in the recursive example, or by any other power based on the number of segments desired. The entropies of each segment may be stored in memory during the segmentation process to ensure that the respective entropies of each segment are balanced. As an example, the entropy of the data set may be divided by a total number of segments to determine an average entropy per segment. The sorted data structure of transaction records may then be divided into separate data structures, such as separate arrays or sub-arrays within the array, wherein each new segment has an entropy that is equal to, or near-equal to (e.g., within a tolerance of), the average entropy per segment. In non-limiting embodiments, a scope of each segment (e.g., a range of transaction values from a sorted array of transaction values) may be adjusted based on a comparison of at least one other entropy of an adjacent segment such that the entropies of the respective adjacent segments are equal or within a predefined tolerance of each other.

Figure 4:
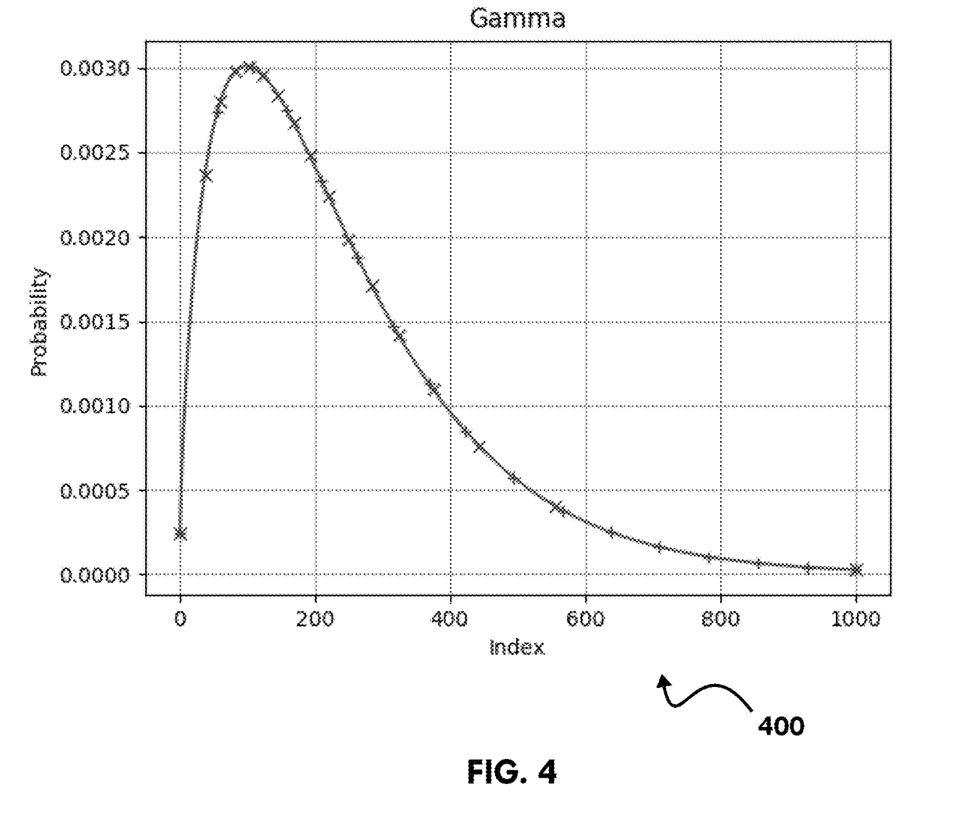
FIG. 4 is an example data distribution chart showing skewed transaction data to be processed in accordance with non-limiting embodiments.

FIG. 4 shows an example data distribution chart 400 for a transaction data set with skewed values. In particular, the chart 400 shows a heavily skewed distribution of values produced from a gamma function, typical of the type of histograms seen in transaction processing. The horizontal or x-axis indicates the index of a value (e.g., an account identifier, such as a PAN, sequenced in alphanumeric order, or a dollar amount of a transaction sequenced by increasing dollar amount). The vertical or y-axis indicates the cardinality of that particular value (i.e., the number of times this value is observed in the data set). The skew to the left of this distribution shows there is a majority of values occurring in smaller index values, typical of dollar values of payment transactions. Splitting this distribution based solely on equal ranges of index values (e.g., 0-200, 200-400, etc.) will result in a skewed allocation of values being assigned to processors. This skewed allocation will result in an overload of some processors and an underload of other processors. Accordingly, the assignment of data sets to computational resources will be suboptimal in such an arrangement, resulting in a job taking needlessly more time than required. Non-limiting embodiments described herein employ the use of an entropy metric to subdivide the distribution of values into segments so as to partition the underlying data into chunks. With this arrangement, available processing resources are given comparable processing loads which results in equitable distribution of processing load and ensures the total processing time needed for a particular data set is minimized in an environment where multiple cores are available for usage.

Figure 2:
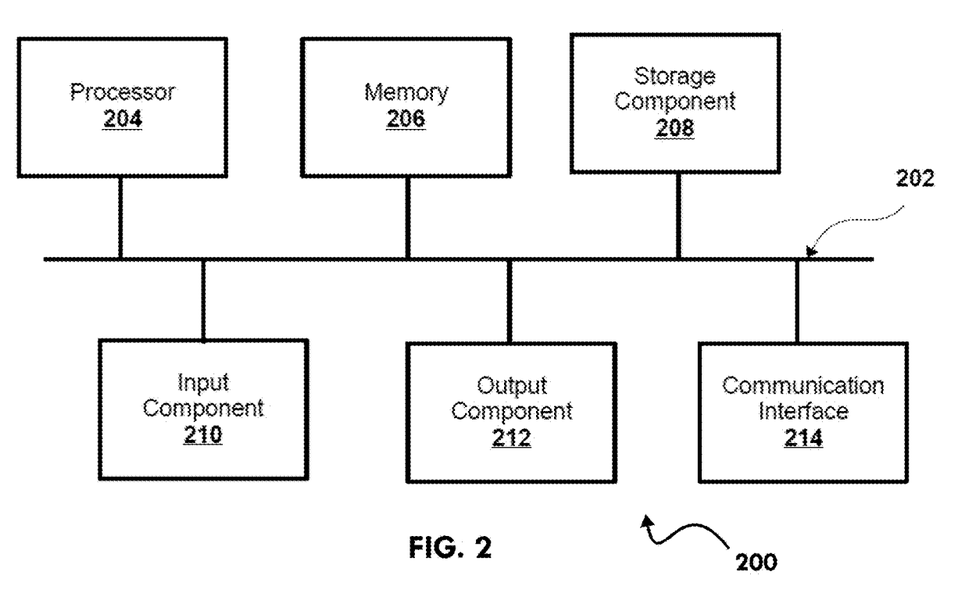
FIG. 2 is a schematic diagram of example components of a computing device according to non-limiting embodiments.

Referring now to FIG. 2, shown is a diagram of example components of a device 200 according to non-limiting embodiments. Device 200 may correspond to one or more devices of the systems 1000, 1001 shown in FIGS. 1A and 1B, such as transaction processing system 100 and allocation processor 102. In some non-limiting embodiments, transaction processing system 100 and/or allocation processor 102 may include at least one device 200 and/or at least one component of device 200. The number and arrangement of components shown in FIG. 2 are provided as an example. In some non-limiting embodiments, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

As shown in FIG. 2, device 200 may include a bus 202, a processor 204, memory 206, a storage component 208, an input component 210, an output component 212, and a communication interface 214. Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

With continued reference to FIG. 2, storage component 208 may store information and/or software related to the operation and use of device 200. For example, storage component 208 may include a hard disk (e.g., a magnetic disk, an optical disk, a magneto-optic disk, a solid state disk, etc.) and/or another type of computer-readable medium. Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.). Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium may include any non-transitory memory device. A memory device includes memory space located inside of a single physical storage device or memory space spread across multiple physical storage devices. Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method executed by at least one processor for load balancing for processing large data sets based on distribution entropy using a plurality of processors, comprising:
    identifying, with the at least one processor, a number of segments based on the number of the plurality of processors, and a transaction data set comprising transaction data for a plurality of payment transactions distributed over a range of transaction values, the transaction data for each payment transaction of the plurality of payment transactions comprising a transaction value representing a payment amount;
    determining, with the at least one processor, a distribution entropy of the transaction data set based on the transaction value of each payment transaction of the plurality of payment transactions;
    repeatedly segmenting, with the at least one processor, the transaction data set into respective pairs of segments until the number of segments is reached, each segment of the number of segments having various sizes, based on the distribution entropy of the transaction data set and balancing respective distribution entropies of each segment of the number of segments such that respective distribution entropies of each segment are balanced to within a predefined tolerance of the distribution entropy of at least one adjacent segment; and
    distributing, with the at least one processor, processing tasks associated with each segment of the number of segments to the plurality of processors to process each payment transaction in each respective segment.

2. The computer-implemented method of claim 1, wherein the transaction data set comprises a plurality of transaction values sorted in a data structure stored in memory of a computer system.

3. The computer-implemented method of claim 2, wherein the data structure comprises an array, and wherein the plurality of transaction values are stored in the array as floating point values.

4. The computer-implemented method of claim 1, wherein the plurality of processors comprises a plurality of cores of at least one processor, and wherein each segment is assigned to a core of the at least one processor.

5. The computer-implemented method of claim 1, wherein balancing respective entropies of each segment of the number of segments comprises adjusting a scope of each segment based on a comparison to the at least one distribution entropy of the at least one adjacent segment.

6. A computer-implemented method executed by at least one processor for load balancing for processing large data sets based on distribution entropy, comprising:
    (a) identifying, with the at least one processor, a number of segments based on the number of the plurality of processors, and a transaction data set for a plurality of payment transactions to be processed, the transaction data set comprising data distributed over a transaction value representing a payment amount of each payment transaction and at least one other parameter;
    (b) determining, with the at least one processor, a distribution entropy of the transaction data set;
    (c) segmenting, with the at least one processor, the transaction data set into respective pairs of transaction data segments having various sizes based on the distribution entropy of the transaction data set and a closest match between respective distribution entropies of each individual transaction data segment in the pair of transaction data segments, such that respective distribution entropies of each segment are balanced to within a predefined tolerance of the distribution entropy of at least one adjacent segment;
    (d) repeating step (c) for each transaction data set formed by segmentation until a total number of transaction data segments reaches the number of segments; and
    (e) distributing, with the at least one processor, processing tasks associated with each segment of the number of segments to the plurality of processors to process each payment transaction in each respective segment.

7. The computer-implemented method of claim 6, wherein the transaction data set comprises a plurality of transaction values sorted in a data structure stored in memory of a computer system.

8. The computer-implemented method of claim 7, wherein the data structure comprises an array, and wherein the plurality of transaction values are stored in the array as floating point values.

9. The computer-implemented method of claim 6, wherein the plurality of processors comprises a plurality of cores of at least one processor, and wherein each segment is assigned to a core of the at least one processor.

10. The computer-implemented method of claim 6, wherein balancing respective entropies of each segment of the number of segments comprises adjusting a scope of each segment based on a comparison to the at least one distribution entropy of the at least one adjacent segment.

11. A computer program product for load balancing for processing large data sets based on distribution entropy using a plurality of processors, comprising at least one non-transitory computer-readable medium including program instructions that, when executed by at least one processor, cause the at least one processor to:
    identify a number of segments based on the number of the plurality of processors, and a transaction data set comprising transaction data for a plurality of payment transactions distributed over a range of transaction values, the transaction data for each payment transaction of the plurality of payment transactions comprising a transaction value representing a payment amount;
    determine a distribution entropy of the transaction data set based on the transaction value of each payment transaction of the plurality of payment transactions;
    repeatedly segment the transaction data set into respective pairs of segments until the number of segments is reached, each segment of the number of segments having various sizes, based on the distribution entropy of the transaction data set and balancing respective distribution entropies of each segment of the number of segments such that respective distribution entropies of each segment are balanced to within a predefined tolerance of the distribution entropy of at least one adjacent segment; and
    distribute processing tasks associated with each segment of the number of segments to the plurality of processors to process each transaction in each respective segment.

12. The computer program product of claim 11, wherein the transaction data set comprises a plurality of transaction values sorted in a data structure stored in memory of a computer system.

13. The computer program product of claim 12, wherein the data structure comprises an array, and wherein the plurality of transaction values are stored in the array as floating point values.

14. The computer program product of claim 11, wherein the plurality of processors comprises a plurality of cores of at least one processor, and wherein each segment is assigned to a core of the at least one processor.

15. The computer program product of claim 11, wherein balancing respective entropies of each segment of the number of segments comprises adjusting a scope of each segment based on a comparison to the at least one distribution entropy of the at least one adjacent segment.

16. A computer program product for load balancing for processing large data sets based on distribution entropy using a plurality of processors, comprising at least one non-transitory computer-readable medium including program instructions that, when executed by at least one processor, cause the at least one processor to:
 (a) identify a number of segments based on the number of the plurality of processors, and a transaction data set for a plurality of payment transactions to be processed, the transaction data set comprising data distributed over a transaction value representing a payment amount of each payment transaction and at least one other parameter;
 (b) determine a distribution entropy of the transaction data set;
 (c) segment the transaction data set into respective pairs of transaction data segments having various sizes based on the distribution entropy of the transaction data set and a closest match between respective entropies of each individual transaction data segment in the pair of transaction data segments, such that respective distribution entropies of each segment are balanced to within a predefined tolerance of the distribution entropy of at least one adjacent segment;
 (d) repeat step (c) for each transaction data set formed by segmentation until a total number of transaction data segments reaches the number of segments; and
 (e) distribute processing tasks associated with each segment of the number of segments to the plurality of processors to process each payment transaction in each respective segment.

17. The computer program product of claim 16, wherein the transaction data set comprises a plurality of transaction values sorted in a data structure stored in memory of a computer system.

18. The computer program product of claim of claim 17, wherein the data structure comprises an array, and wherein the plurality of transaction values are stored in the array as floating point values.

19. The computer program product of claim 16, wherein the plurality of processors comprises a plurality of cores of at least one processor, and wherein each segment is assigned to a core of the at least one processor.

20. The computer program product of claim 16, wherein balancing respective entropies of each segment of the number of segments comprises adjusting a scope of each segment based on a comparison to the at least one distribution entropy of the at least one adjacent segment.

\* \* \* \* \*